(12) United States Patent
Feinstein (10) Patent No.: US 8,257,658 B2
(45) Date of Patent: *Sep. 4, 2012

(54) REACTOR WITH JET IMPINGMENT HEAT TRANSFER

(75) Inventor: Jonathan J. Feinstein, North Salem, NY (US)

(73) Assignee: Tribute Creations, LLC, Windsor Locks, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,747

(22) Filed: May 11, 2011

(65) Prior Publication Data

US 2011/0211999 A1   Sep. 1, 2011

Related U.S. Application Data (63) Continuation of application No. 11/796,273, filed on Apr. 27, 2007, which is a continuation of application No. PCT/US2005/042425, filed on Nov. 22, 2005.

(60) Provisional application No. 60/630,492, filed on Nov. 23, 2004.

(51) Int. Cl.
   *B01D 50/00*   (2006.01)

(52) U.S. Cl. ......................................... 422/177

(58) Field of Classification Search .................. 422/177, 422/180

See application file for complete search history.

(56) References Cited

U.S. PATENT DOCUMENTS

| 4,340,501 A | 7/1982 | Davidson |
| 4,719,090 A | 1/1988 | Masaki |
| 4,985,230 A | 1/1991 | Baden et al. |
| 5,029,638 A | 7/1991 | Valenzuela |
| 5,130,100 A * | 7/1992 | Serizawa ...................... 422/180 |
| 5,350,566 A | 9/1994 | Stringaro |
| 5,419,878 A | 5/1995 | Honma |
| 5,651,946 A | 7/1997 | Dekumbis |
| 6,040,064 A | 3/2000 | Brueck et al. |
| 6,534,022 B1 | 3/2003 | Carlborg et al. |
| 7,112,050 B2 * | 9/2006 | Bernas et al. ................. 425/190 |
| 2002/0042344 A1 | 4/2002 | Kondo et al. |
| 2006/0008399 A1 | 1/2006 | Feinstein |

FOREIGN PATENT DOCUMENTS

| DE | 12 61 484 B | 2/1968 |
| EP | 0025308 A1 | 3/1981 |
| EP | 0 298 943 A2 | 1/1989 |
| EP | 1 099 924 A2 | 5/2001 |
| FR | 2 827 527 A1 | 1/2003 |
| JP | 2003-512150 A1 | 4/2003 |

(Continued)

OTHER PUBLICATIONS

International Search Report for International Application No. PCT/US2005/042425 mailed Sep. 14, 2006 (Form PCT/ISA/210).

(Continued)

Primary Examiner — Tom Duong (74) Attorney, Agent, or Firm — Robert P. Michal; Lucas & Mercanti, LLP (57) ABSTRACT

A catalytic reactor containing a core structure near the reactor axis and a casing structure near the reactor wall, the two structures differing from each other to promote catalysis and heat transfer, respectively. The casing contains a multiplicity of first devices for directing fluid centrifugally impinge a reactor wall and second devices for permitting fluid to flow away from a reactor wall as the fluid flows from the inlet to the outlet of the reactor.

19 Claims, 6 Drawing Sheets

FOREIGN PATENT DOCUMENTS

| | | |
|---|---|---|
| WO | WO 01/28665 A1 | 4/2001 |
| WO | WO 2006/016966 A2 | 2/2006 |

OTHER PUBLICATIONS

English Translation of Notification of Reason(s) for Refusal dated Sep. 24, 2010 issued by the Japanese Patent Office in a corresponding Japanese Application No. 2007-543432 (3 pages).

Notification of Reason(s) for Refusal dated Sep. 24, 2010 issued by the Japanese Patent Office in a corresponding Japanese Application No. 2007-543432 (2 pages).

Supplementary European Search Report dated Dec. 3, 2010 issued by the European Patent Office in a corresponding European Application No. 05 85 2058 (5 pages).

\* cited by examiner

REACTOR WITH JET IMPINGMENT HEAT TRANSFER

CROSS REFERENCE TO RELATED APPLICATION

This application is a continuation of U.S. patent application Ser. No. 11/796,273 filed Apr. 27, 2007, which is a continuation of International Application Serial No. PCT/US2005/042425 filed Nov. 22, 2005, which claims the benefit of the filing date of U.S. Provisional Patent Application Ser. No. 60/630,492, filed Nov. 23, 2004, the entire disclosure of each of which is incorporated herein by reference.

FIELD OF INVENTION

The present invention relates to catalytic reactors.

BACKGROUND INFORMATION

Catalytic reactors are known for promoting chemical reactions. Heterogeneous catalytic reactors are referred to herein.

Jet impingement of a fluid onto a solid surface is known to increase the heat transfer coefficient near the surface for applications such as cooling turbine veins and electronic components. U.S. Pat. No. 5,029,638, the entire disclosure of which is incorporated herein by reference in its entirety, teaches jet impingement and suitable configurations to assist heat transfer in a compact heat exchanger.

U.S. Pat. Nos. 5,350,566, 5,651,946 and 4,719,090, referred to collectively herein as the three patents, and each of which is incorporated herein by reference in its entirety, each teach permeable, engineered structures which may be used for catalysis and which provide mixing of process fluid by enhancing turbulence throughout a reactor. The three patents each utilize corrugated sheets with the corrugations inclined at an oblique angle to the general direction of fluid flow from respective reactor inlets to their outlets. The corrugated sheets are perforated or have spaces between them or both. The obliquely inclined corrugations induce a lateral component to the fluid velocity. The perforations or spaces between the corrugated sheets provide lateral return paths for the fluid to maintain zero net lateral flow through the reactors. Lateral flows are induced at smaller scale distances while at larger scale distances net lateral flow is balanced. Each of the three patents teaches promoting mixing. The designs accordingly do not preserve lateral momentum, but combine fluids with opposite lateral component velocities, effecting mutual annihilation of their respective lateral momentums. Such designs, while effective for mixing, are less effective for the destruction of a boundary layer at a reactor wall or for increasing the heat transfer coefficient near the reactor wall than the projection of jets to impinge reactor walls at a low angle of incidence.

Further, the three patents utilize parallel stacks of corrugated sheets at alternating inclinations. Because the sheets are in flat, parallel planes, the channels are chordal to the reactor cross section. This results in some channels being normal to the reactor wall near some parts of the reactor wall and being parallel to the reactor wall near other parts of the reactor wall, making them less effective and less consistent in increasing heat transfer at all parts of the reactor wall than radially arrayed channels.

European Patent No. EP0025308 A1, the entire disclosure of which is incorporated herein by reference in its entirety, teaches an apparatus to cause fluid to flow alternatingly through a reactor core structure and through a space between the core structure and the vessel wall. This patent does not teach the destruction of the boundary layer at the reactor wall by jet impingement. All embodiments teach extensive fluid flow parallel to the reactor wall through an empty space between the reactor wall and the packing. The patent also teaches two alternative types of structure. One uses a perforated structure and the other uses an unperforated or solid structure. Where perforated structures are used, fluid flow is largely axial with turbulence and mixing in transverse directions and flow near the reactor wall is parallel to that wall in the axial direction. Such flow is ineffective for destroying a fluid boundary layer at a reactor wall relative to jet impingement. Where solid sheets are used, the open or effective cross sectional area of the reactor is compromised because the flow passages within the central structure communicate with each other only via the empty space between the core structure and the reactor wall. This constraint amplifies pressure drops relative to a suitably perforated structure or one in which crisscrossing channels generally communicate with each other.

Use of truncated cones in EP0025308 A1 is anticipated exclusively for annular reactor cross sections. Such truncated cones are either perforated or placed in alternating zones in series to cause alternating centrifugal and centripetal flow along the reactor length. Fluid flow paths extensively parallel to the reactor wall are described in detail for all embodiments. The use of an empty space between the core structure and the reactor wall promotes axial flow along the surface of the reactor wall instead of extensive, uniformly and finely distributed jet impingement of the reactor wall.

U.S. Pat. No. 4,985,230, the disclosure of which is incorporated herein by reference in its entirety, teaches the transmission of heat from a first wall to a second wall via fluid passing through channels that alternately project the fluid toward a first and second wall. The walls are parallel to and uniformly spaced from each other. The channels support a catalyst for performing heterogeneous catalysis of the fluid. One wall is a reactor wall and the other wall is an internal wall within the reactor. This art may be beneficial for the particular application of annular or bayonet reactors such as are used in steam reforming, but can not be applied to a cylindrical or other solid shaped reactor. The radially aligned channels in U.S. Pat. No. 4,985,230 are bounded in the axial directions and must be fed by laterally flowing fluid. Because the channels converge at the reactor axis they necessarily have reduced width or cross sectional area nearer the reactor axis than near the reactor wall. If such a packing were used throughout a cylindrical reactor the reduced cross sectional area of the converging walls near the reactor axis would restrict flow of fluid through channels, making heat transfer ineffective. Extension of the channels to the reactor axis would also substantially increase undesirable pressure drop through the reactor.

SUMMARY OF THE INVENTION

The present invention relates to catalytic reactors of circular or other full cross section as opposed to annular spaces or reactor volumes that at least partly contain or surround volumes not part of the reactor. It is the purpose of the present invention to overcome each of the above difficulties and in particular to provide effective heat transfer throughout the volume and particularly near the reactor wall of a catalytic reactor of circular or other full cross section.

The present invention is useful for steam reforming reactors and for catalytic converters for treatment to eliminate emissions from internal combustion engines. In the latter case the present invention aids cooling of the converter to prolong the life of the catalyst.

The Summary of the Invention is provided as a guide to understanding the invention. It does not necessarily describe the most generic embodiment of the invention or all species of the invention disclosed herein.

The present invention is an apparatus which carries out reactions of fluid at a catalytic surface and which carries out heat transfer at a reactor wall. A first structure near the axis of the reactor and a second structure near the wall of the reactor are provided which structures differ from each other to promote the respective purposes of catalysis and heat treansfer.

The catalytic reactor includes a volume that does not enclose a second volume, which second volume is not part of the reactor. Generally, the reactor is a cylindrical volume enclosed by a reactor wall with an inlet at a first end and an outlet at a second end. The reactor contains solid surfaces which contain a suitable active catalytic component to promote a desired reaction.

The structure near the axis of the reactor, herein referred to as the core, extends from the reactor axis to a predetermined distance from the inside of the reactor wall toward the reactor axis. The predetermined distance is about 0.01 to 0.4 and preferably 0.05 to 0.2 times the distance from inside of the reactor wall to the reactor's axis. The geometric shapes comprising the core permit fluid flow in both axial and radial directions through communicating passages. Examples of suitable cores include spherical or cylindrical particles, pellets containing holes, Raschig rings, saddles, monolithic structures containing perforated channels or crisscrossing channels that communicate with each other, and the like. Monolithic core structures, also referred to as engineered packings, are preferred, including those which can be found in FIGS. 17 and 18 of U.S. patent application Ser. No. 10/886,237 filed Jul. 7, 2004 entitled "Reactor with Primary and Secondary Channels" by Jonathan J. Feinstein, the entire disclosure of which is incorporated herein by reference. Monolithic cores may be composed of metal, ceramic or combinations of metal and ceramic, and are preferably composed of a metal substrate coated with a suitable catalyst carrier and active catalyst.

The structure near the reactor wall, herein referred to as the casing, extends from the inside of the reactor wall to the predetermined distance from the inside of the reactor wall. The casing is between the core and the reactor wall at all parts of the reactor wall where effective heat transfer is desired. The casing contains a multiplicity of first devices for directing fluid centrifugally to impinge a reactor wall and second devices for permitting fluid to flow away from a reactor wall as the fluid flows from the inlet to the outlet of the reactor. The first device is preferably a channel enclosed by solid walls. The second device may be a wall, vane, channel or porous structure. An example porous structure is perforated walls or channels which permit fluid to traverse the walls or channels. The casing may be formed separately from the core or may be an extension of the core structure with suitable alteration of its porosity as to provide the first and second devices. An example alteration is for surfaces to be solid in the casing at suitable locations, which analogous surfaces in the core are perforated. The casing may be composed of metal or ceramic and is preferably composed of a metal substrate coated with a suitable catalyst carrier and active catalyst.

The casing is a monolith, defined herein as an engineered structure including adjoining solid or perforated walls or sheets with fluid passages between them. The structure of the core differs from the structure of the casing in at least one of four ways. The first difference is that the core is not a monolith. The second difference is that the core is a monolith that contains at least a 10% lower percentage volume of solid walled channels for directing fluid centrifugally as it flows from the inlet to the outlet of the reactor than the casing. The third difference is that the core is a monolith that contains at least a 10% lower void volume than the casing. The forth difference is that the core is a monolith that contains solid walled channels for directing fluid centrifugally as it flows from the inlet to the outlet of the reactor which channels have at least a 10% higher average hydraulic diameter than the casing, where the hydraulic diameter is equal to 4 times the cross sectional area of a channel divided by the perimeter of the channel cross section.

Solid walled channels in the casing for directing fluid centrifugally as it flows from the inlet to the outlet of the reactor are radially arrayed and cause fluid to impinge the reactor wall and at an angle of incidence of 0 to 85 degrees and preferably 0 to 45 degrees.

The permeability of the casing can be designed to be higher than the permeability of the core such that the axial mass flux of fluid through the casing is higher than in the core to further increase the heat transfer coefficient of the fluid at the reactor wall.

DETAILED DESCRIPTION OF THE INVENTION

The Detailed Description is exemplary and not limiting.

Figure 1A:
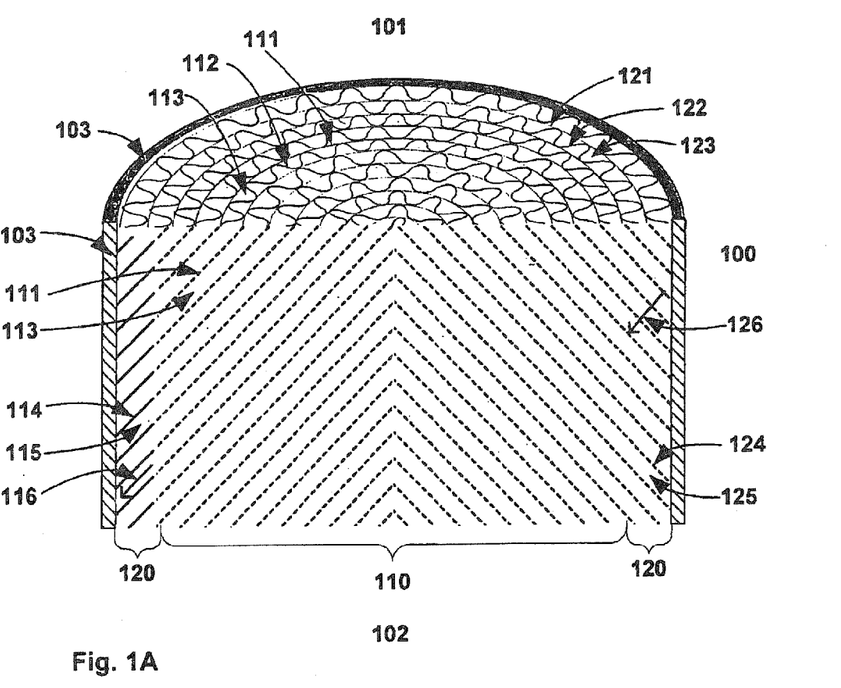
FIG. 1A is a partial perspective cutaway view of one embodiment of a reactor according to the present invention including a monolith of smooth and corrugated frustoconical sheets which have altered properties to provide different core and casing structures and functions.

Referring to FIG. 1A unless otherwise indicated, FIG. 1A illustrates a partial perspective cutaway view of an example embodiment. Catalytic reactor 100 has an inlet 101, an outlet 102, and cylindrical reactor wall 103. The internal volume includes a core 110 and a casing 120. The core comprises a monolithic substrate composed of smooth cone shaped sheets 111, shown in both the transverse and longitudinal sections, separated by corrugated cone shaped sheets 112, shown only in the transverse cross section. Both the smooth and corrugated sheets in the core are perforated as denoted in this and other examples of perforated surfaces by dashed lines. The spaces between the smooth and corrugated sheets constitute channels 113. The smooth and corrugated cones are preferably at an angle of 45° to the reactor wall. Channels 113 are radially arrayed. Fluid passes from the inlet to the outlet through the core along channels 113 and through perforations in the channels with minimal tortuousity in the axial direction. The core contains no solid walled channels for directing fluid centrifugally as it flows from the inlet to the outlet of the reactor.

The casing constitutes an extension of the smooth and corrugated cones in the core, but with alteration of the core structure to promote heat transfer at the reactor wall. The casing includes smooth frustoconical sheets 121 interleaved with and separated by corrugated frustoconical sheets 122, which are extensions of sheets 111 and 112, respectively. The spaces between the smooth and corrugated sheets in the casing create channels 123, which extend in the axial direction along the frustoconical surfaces. The frustoconical surfaces of the casing are at the same angle of inclination to the reactor wall as the conical surfaces in the core. The smooth sheets 121 abut the reactor wall. There is a gap, not shown, between the corrugated sheets of the casing and the reactor wall. The gap is described in the description of FIG. 1D. The sheets of the casing contain portions that are perforated 124 and other portions that are solid 114, creating channels 115 that are completely enclosed by solid surfaces and channels 125 that are at least partially enclosed by perforated surfaces. Solid channels 115 direct fluid centrifugally to impinge the reactor wall as the fluid flows from the inlet to the outlet of the reactor. The said centrifugal flow is depicted by arrow 116. Channels 125 permit fluid to return centripetally from the reactor wall as the fluid flows from the inlet to the outlet of the reactor. Arrow 126 depicts the flow direction of fluid traversing perforated channels 125.

Channels 115 are arranged and aligned in axial stacks one channel abreast in the circumferential direction. Channels 125 are arranged and aligned in axial stacks at least two channels abreast in the circumferential direction. The stacks of channels 115 and of channels 125 extend from the inlet to the outlet of the reactor or over the portions of the reactor where effective heat transfer with the environment of the reactor is desired. Stacks of channels 115 and 125 alternate around the entire circumference of the reactor wall or around the parts of the reactor wall where effective heat transfer with the reactor's environment is desired. The arrangement of the stacks is further clarified in FIGS. 1B, 1C and 1D.

Although it is generally preferred that smooth and corrugated sheets in the casing are perforated to provide uniform permeability, in some applications where heat transfer is relatively more important than pressure drop, the perforation density may be designed to provide lower axial permeability nearer the reactor axis than near the reactor wall. The said variation of permeability promotes the relative flow and velocity of fluid impinging the reactor wall for a given fluid flow through the reactor and further increases the heat transfer coefficient at the reactor wall.

Figure 1B:
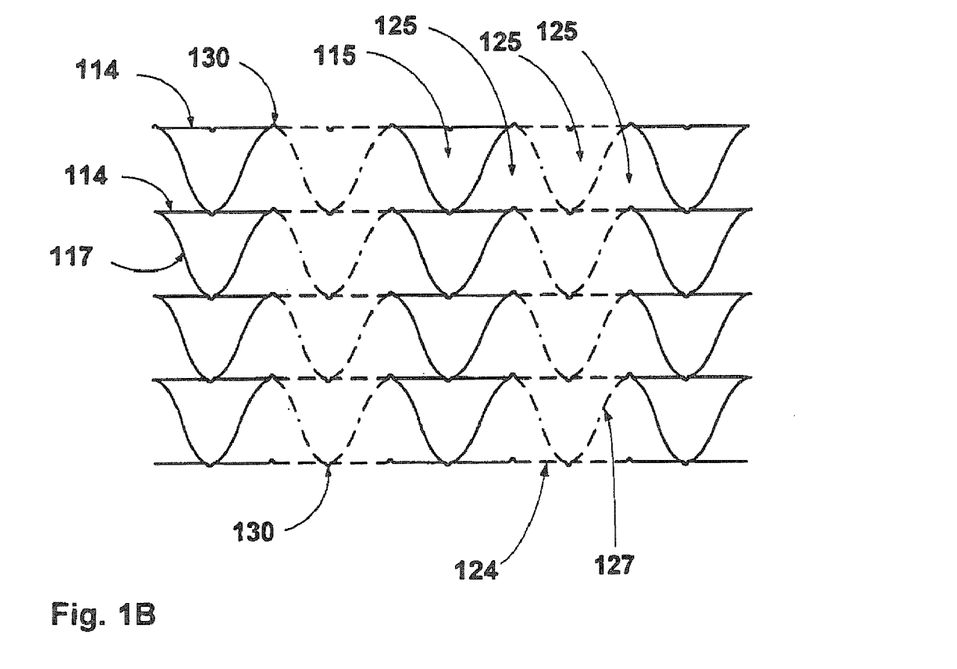
FIG. 1B is a cross sectional view through a circumferential surface of some channels of the embodiment of FIG. 1A.

Referring to FIG. 1B unless otherwise indicated, FIG. 1B illustrates a circumferential surface through the casing of the embodiment in FIG. 1A. The casing includes alternating smooth and corrugated frustoconical sheets forming channels between them. Portions 114 of the smooth sheets are solid as illustrated by solid lines, and portions 124 of the smooth sheets are perforated as illustrated by dashed lines. Portions 117 of the corrugated sheets are solid as illustrated by solid lines, and portions 127 of the corrugated sheets are perforated as illustrated by dashed lines. Channels 115 are enclosed by solid surfaces, and channels 125 are at least partially enclosed by perforated surfaces. The portions of the smooth and corrugated sheets are so arranged as to create vertical or axial stacks one channel abreast of channels 115 alternating circumferentially with vertical stacks of channels 125 three channels abreast. The stacks extend from the inlet to the outlet of the reactor or where effective heat transfer is desired. Channels 115 direct fluid centrifugally to impinge the reactor wall as they flow along the length of the said channels. Fluid in channels 125 substantially traverses the channels 125 to effect flow both from the inlet to the outlet of the reactor and centripetally away from the reactor wall. Optional groves or dimples may be formed in the smooth and corrugated sheets to form tongue and groove junctions 130 to index the relative positions of the smooth and corrugated sheets and thereby assure alignment of the stacks. The percentage of open or perforated area of smooth sheets enclosing channels 125 and the number of channels abreast in a given stack of channels 125 is adjusted to permit fluid to flow through the smooth perforated surfaces at sufficiently low pressure drop for fluid to flow through the casing to provide desired heat transfer at the reactor wall. The percentage of open or perforated area of surfaces 124 may be higher than in the smooth sheets in the core, or the number of channels 124 abreast in a given stack may be increased, according to the angle of inclination of the cones and the cross section shape of the corrugations.

Figure 1C:
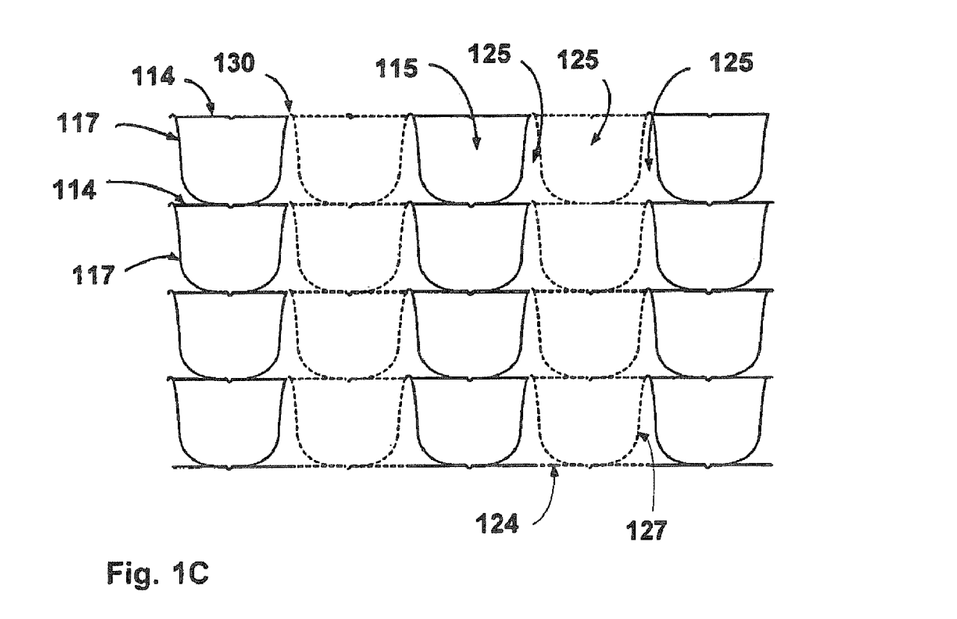
FIG. 1C is a cross sectional view through a circumferential surface of a second variation of channel shapes of the embodiment of FIG. 1A.

Referring to FIG. 1C unless otherwise indicated, FIG. 1C illustrates a circumferential surface through the casing of a different corrugation profile of the embodiment in FIG. 1A. The casing comprises alternating smooth and corrugated frustoconical sheets forming channels between them. Portions 114 of the smooth sheets are solid as illustrated by solid lines, and portions 124 of the smooth sheets are perforated as illustrated by dashed lines. Portions 117 of the corrugated sheets are solid as illustrated by solid lines, and portions 127 of the corrugated sheets are perforated as illustrated by dashed lines. Channels 115 are enclosed by solid surfaces, and channels 125 are at least partially enclosed by perforated surfaces. The portions of the smooth and corrugated sheets are so arranged as to create vertical stacks one channel abreast of channels 115 alternating circumferentially with vertical stacks of channels 125 three channels abreast. The stacks extend from the inlet to the outlet of the reactor or where effective heat transfer is desired. Channels 125 direct fluid centrifugally to impinge the reactor wall as the fluid flows along the length of the said channels. Fluid in channels 125 substantially traverses the channels 125 to effect flow both from the inlet to the outlet of the reactor and centripetally away from the reactor wall. Optional groves or dimples may be formed in the smooth and corrugated sheets to form tongue and groove junctions 130 to index the relative positions of the smooth and corrugated sheets and thereby assure alignment of the stacks.

The shape of the corrugations incorporates narrow concave downward sections and wide concave upward sections. The shape of corrugation in FIG. 1C permits a more uniform width of stacks containing channels 115 relative to the shape illustrated in FIG. 1B.

Figure 1D:
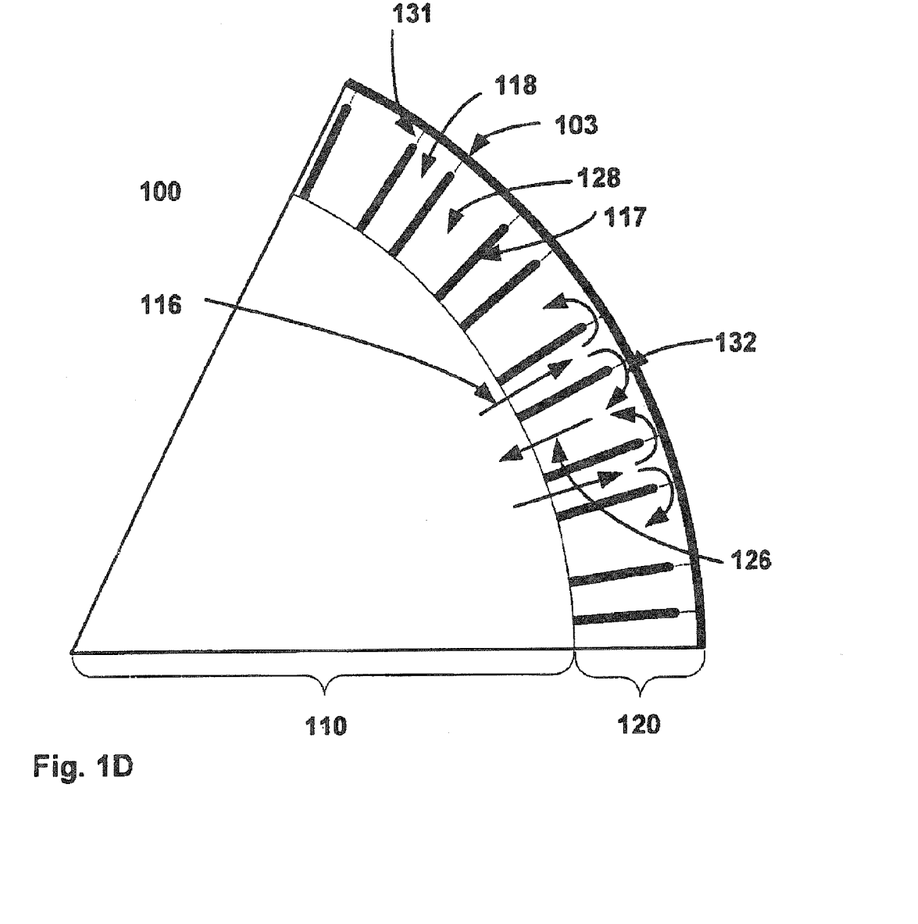
FIG. 1D is part of a transverse cross section of the reactor of the embodiment of FIG. 1A, illustrating the communication of channels within the casing and the radial fluid flow patterns.

Referring to FIG. 1D unless otherwise indicated, FIG. 1D shows part of a transverse section through the reactor embodiment in FIG. 1A. Reactor 100 has a wall 103, a core 110, and a casing 120. Structures within the core are not shown. In the casing solid, corrugated sheets 117 separate stacks 118 of channels enclosed by solid corrugated, and smooth sheets from stacks 128 of channels at least partially enclosed by perforated smooth and corrugated sheets. Alternating stacks 118 and 128 are positioned around the circumference of the reactor wall. In stacks 118 channels are stacked one channel abreast and are narrower circumferentially than stacks 128, in which channels are stacked at least two channels abreast circumferentially. Channels in stacks 118 direct fluid centrifugally to impinge the reactor wall as depicted by arrows 116. Fluid directed to the reactor wall by channels in stacks 118 exits stacks 118 and enters stacks 128 via a gap 131 between the corrugated sheets and the reactor wall as depicted by arrows 132. Fluid entering stacks 128 near the reactor wall returns centripetally from the reactor wall as depicted by arrows 126.

The width of the gap is a multiple of the average circumferential width of stacks 118 at their ends nearest to the reactor wall. In applications where it is relatively more important to minimize pressure drop than increase heat transfer, the multiple may be in the range of about 0.5 to 2.0. For applications where attainment of high heat transfer is relatively more important than minimization of pressure drop the multiple may be in the range of about 0.1 to 0.7. The width of the gap may be uniform or serrated, according to the way the edges of the corrugated sheets are cut before forming. Where the gap is not uniform the said multiples pertaining to the gap width define the average gap width.

Figure 2A:
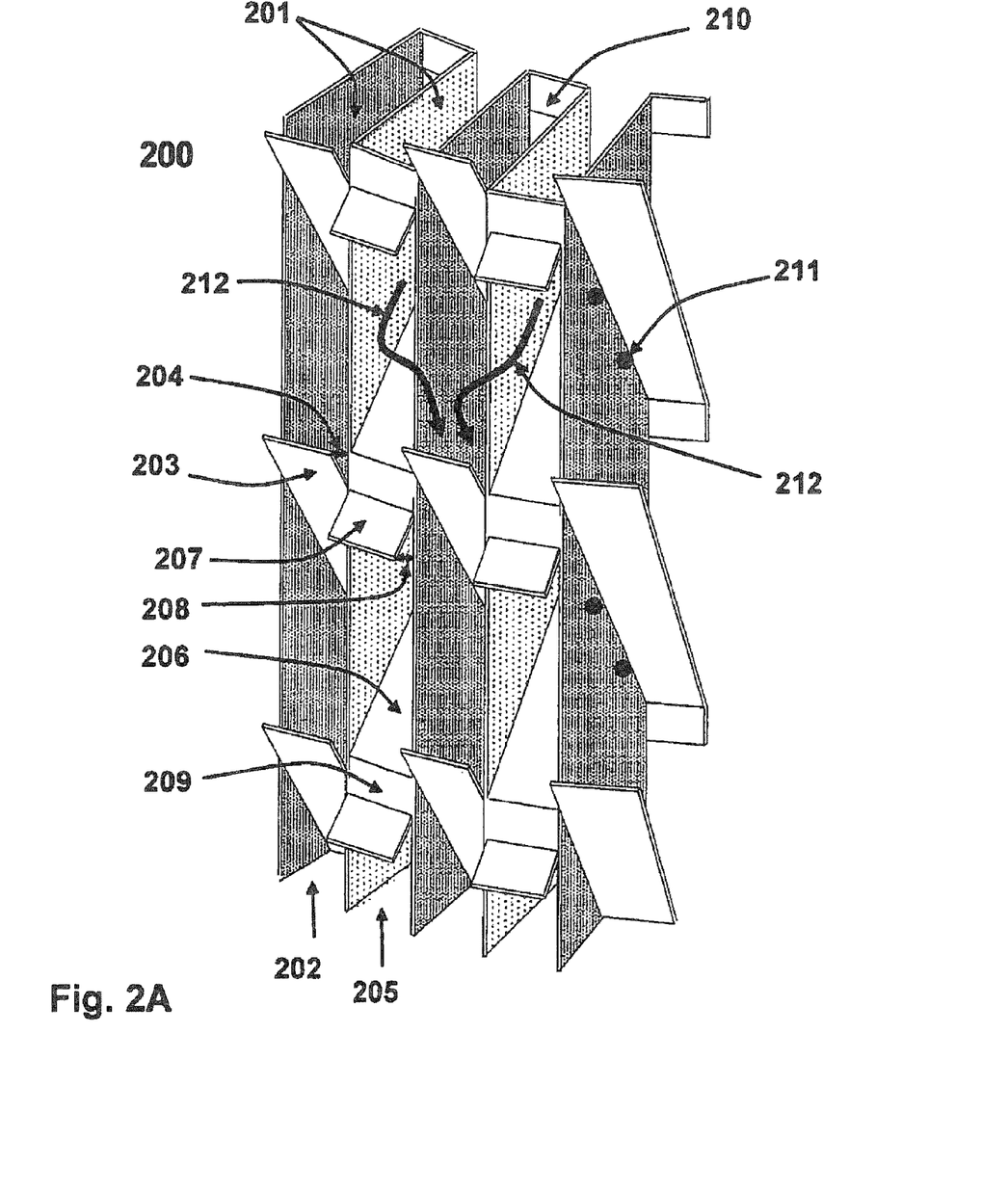
FIG. 2A shows a partial perspective view of a second embodiment of a casing of the present invention.

Referring to FIG. 2A unless otherwise indicated, FIG. 2A illustrates another embodiment of a casing according to the invention in which channels with solid walls are provided for conveying fluid both to and from a reactor wall. It is suitable for use in a cylindrical reactor. Alternating columns positioned between the core and reactor wall contain vanes that direct centrifugal and centripetal flows of fluid, respectively. The reactor inlet, not shown, is above, and the reactor outlet, not shown, is below the illustrated section of casing 200. Casing 200 comprises column separating walls 201 that separate columns from each other. Columns 202 contain vanes 203 for directing fluid centripetally away from a reactor wall, not shown, as the fluid flows from the inlet to the outlet of a reactor, or from the top to the bottom of the casing as illustrated. The top edges of vanes 203 abut the reactor wall to separate the column separating walls from the reactor wall by a gap distance 204. Columns 205 contain vanes 206 and gap spacers 207 for directing fluid centrifugally to impinge a reactor wall. The lower edges of the gap spacers abut the reactor wall to separate the column separating walls from the reactor wall by a gap distance 208, which is equal to gap distance 204. Column width spacers 209 near the reactor wall and column width spacers 210 abutting the core maintain the circumferential width of columns 205 and 202, respectively. Widths of columns 202 and 205 are about equal to each other. Column width spacers 209 are wider than spacers 210 so that the casing conforms to the curvature of the reactor wall. Raised dimples 211 may be pressed into the column separating walls on either side of the vanes to hold the vanes in position. Arrows 212 indicate the direction of fluid flow through the casing of first approaching the reactor wall via columns 205 between vanes 206, then impinging the reactor wall, not shown, then turning laterally in the circumferential direction through gaps between column separating walls and the reactor wall, to enter columns 202 and be redirected centripetally by vanes 203 away from the reactor wall as they flow from the inlet to the outlet of the reactor. The casing lies between the core and the reactor wall around the entire reactor circumference and from the inlet to the outlet of the reactor.

Figure 2B:
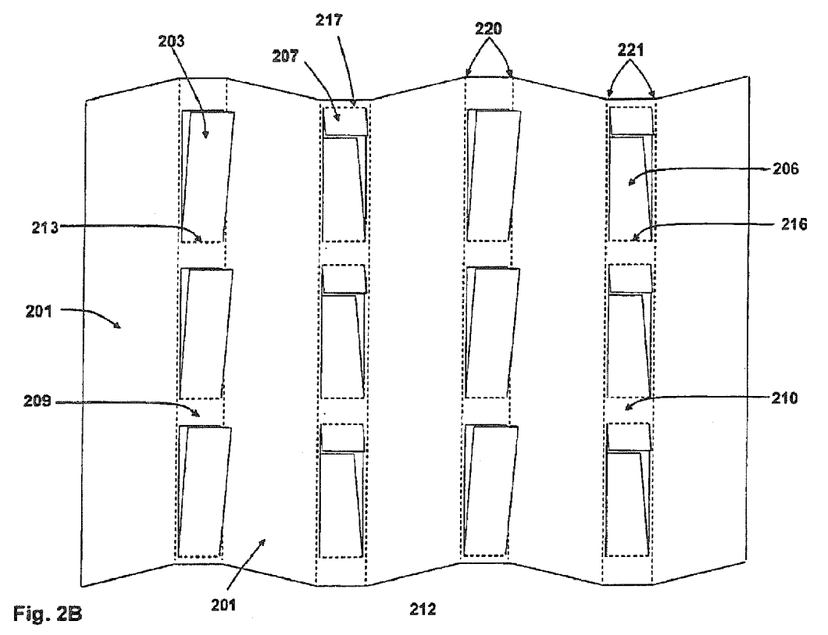
FIG. 2B illustrates a method for forming the embodiment illustrated in FIG. 2A.

Referring to FIG. 2B unless otherwise indicated, FIG. 2B illustrates a forming method to construct a casing shown in FIG. 2A. The casing is constructed from metal sheet 212. Vanes 203 and gap spacers 207 are cut on three edges as shown and are folded forward about 45 degrees along dotted lines 213 and 217, respectively. Vanes 206 are cut on three edges and folded backward about 45 degrees along dotted lines 216. The sheet is folded forward along dotted lines 220 proximate the sides of vanes 203 and is folded backwards along dotted lines 221 proximate the sides of vanes 206 about 90 degrees or until column separating walls 201 contact the edges of vanes 203 and 206. Column width spacers 209 and 210 are preferably at the same elevation. The widths of vanes 203 and 206 may be tapered and the width of column width spacers 209 may be greater than the width of column width spacers 210 to allow the casing to conform to the curvature of the reactor wall and for the vanes to abut all parts of the separating walls. The folded casing is then coated with a suitable catalyst carrier and active catalyst and is inserted in a reactor between a core and reactor wall.

Figure 3A:
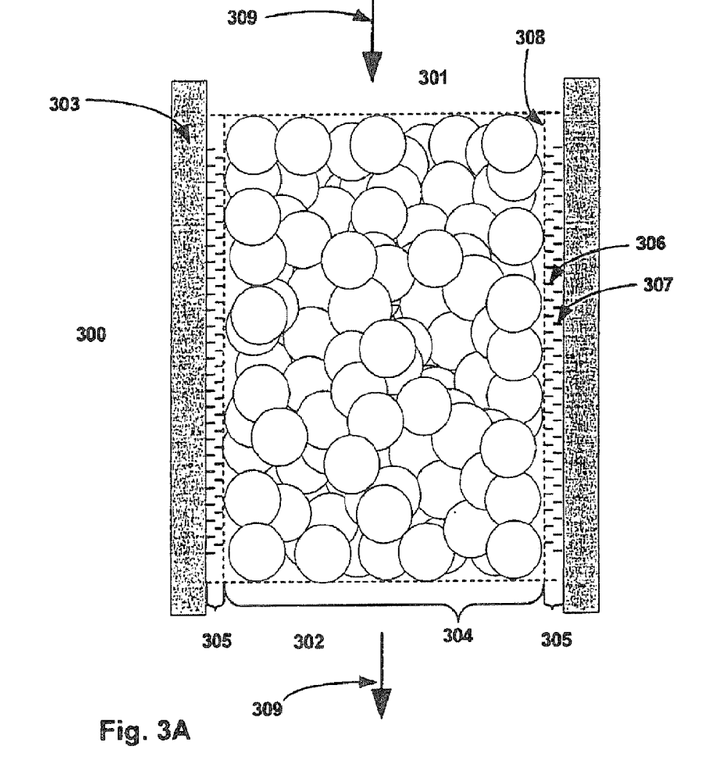
FIG. 3A is a longitudinal section view of another embodiment of the present invention.

Referring to FIG. 3A unless otherwise indicated, FIG. 3A illustrates a longitudinal cross section of an example embodiment of the present invention. Catalytic reactor 300 has an inlet 301, an outlet 302, and cylindrical reactor wall 303. The internal volume comprises a core 304 and a casing 305. The core comprises a random packing of solid alumina spheres which are impregnated with an active catalyst. The casing is between the core and the reactor wall at all parts of the reactor wall from the inlet to the outlet of the reactor. The casing comprises flat rings 306 and 307 separated by axial spaces. The surface between the casing and the core may optionally comprise a perforated wall depicted by dashed lines 308. The direction of fluid flow into the inlet through the reactor and out of the outlet is shown by arrows 309.

Figure 3B:
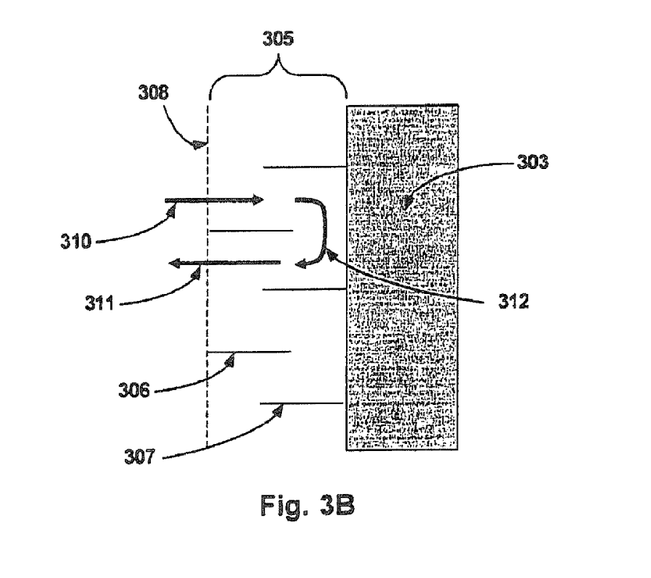
FIG. 3B illustrates details of the casing shown in FIG. 3A.

Referring to FIG. 3B unless otherwise indicated, FIG. 3B illustrates an enlarged portion near the reactor wall of the view described in FIG. 3A. The casing 305 abuts the reactor wall 303. The casing comprises inner flat rings 306 and outer flat rings 307. The inner rings and outer rings are positioned relative to each other and the wall as to form baffles or alternating channels for directing fluid to flow centrifugally to impinge a reactor wall as depicted by arrow 310 and return centripetally from a reactor wall as depicted by arrow 311 as the fluid flows from the inlet to the outlet of the reactor. Fluid flowing through channels centrifugally impinges the reactor wall as depicted by arrow 312 and is deflected to channels in which it flows centripetally. Fluid passages in the casing communicate with fluid passages in the core. An optional perforated wall may be positioned between the casing and core as depicted by dashed line 308. Outer flat rings abut the reactor wall and have an inner diameter smaller than the outer diameter of the inner flat rings. Inner flat rings abut the core at their inside diameter, which defines the inside diameter of the casing and have an outer diameter at least half the distance from the core to the reactor wall. The inner and outer rings are positioned in an alternating sequence from the inlet to the outlet of the reactor. The spacing between adjacent inner and outer rings is uniform. The gap between the inner rings and the reactor wall is approximately the same distance as the axial distance between an adjacent inner and outer ring. The distance from the core to the reactor wall is about 0.01 to 0.4 and preferably 00.05 to 0.2 times the distance from inside of the reactor wall to the reactor's axis. The inner and outer rings are secured by longitudinal supports or struts, not shown.

EXAMPLE

As an example of the embodiment using a casing as described in FIG. 2B, the following dimensions may be used. Numbered references to parts of the casing refer to those parts as numbered in FIG. 2B. The example pertains to a steam reforming reactor used in the manufacture of hydrogen having a wall with an inside diameter of 100 mm, a thickness of 13 mm, a length of 10 meters, an inlet at the top end and an outlet at the bottom end. The core diameter is 80 mm. The casing extends from the core to the reactor wall, a distance of 10 mm. The casing is divided into 80 columns, which are approximately 3.9 mm wide at the reactor wall. A metal sheet 0.2 mm thick, 945 mm wide and 500 mm long in the reactor's axial direction is used for the casing substrate. Column separating walls are 8.0 mm wide, leaving a 2.0 mm gap between the column separating walls and the reactor wall. Vanes 203 are 14.1 mm long, 3.9 mm wide at the cut end and 3.5 mm wide at the folded end. Vanes 206 are 11.4 mm long, 3.5 mm wide at the cut and 3.9 mm wide at the folded end. Gap spacers 207 are 2.8 mm long and 3.9 mm wide. Column width spacers 209 are 3 mm high and 3.9 mm wide. Column width spacers 210 are 3 mm high and 3.5 mm wide. Spacers 209 and 210 are preferably aligned with respect to elevation. Vanes 203 and gap spacers 207 are folded forward 45 degrees along fold lines 213 and 217, respectively, and vanes 206 are folded backwards 45 degrees along fold lines 216. The sheet is folded forward about 90 degrees along fold lines 220, which are 3.5 mm apart and proximate the sides of vanes 203. The sheet is folded backwards about 90 degrees along fold lines 221, which are 3.9 mm apart and proximate the sides of vanes 206. The casing is formed into a tubular shape and the first and last column separating walls may be caused to interlock by folding them.

The core is constructed as described in Example 1 of U.S. patent application Ser. No. 10/886,237 filed Jul. 7, 2004 entitled "Reactor with Primary and Secondary Channels" by Jonathan J. Feinstein, constructed to an 80 mm diameter and in 500 mm long, nested modules.

The core and casing are coated with a conventional catalyst carrier containing alumina and impregnated with a suitable active catalyst containing nickel oxide. Several such casing assemblies and core assemblies are mounted in the reactor end to end to fill the reactor. Process gases are made to flow through the reactor to perform steam reforming.

I claim:

1. An engineered packing for use in a reactor comprising: an inlet, an outlet, an axis, a core structure disposed at least proximate the axis and having a plurality of passages for passage of fluid therethrough, and a monolithic casing structure disposed about at least a portion of the core structure, the monolithic casing structure being distinct from the core structure and including a plurality of channels in fluid communication with the plurality of passages of the core structure, for directing fluid through the reactor centrifugally to impinge said reactor wall at an angle of incidence of not more than 85 degrees with respect to the reactor wall.

2. The engineered packing of claim 1, wherein the core structure is non-monolithic.

3. The engineered packing of claim 1, wherein the core structure has a void fraction which is at least 10% lower than a void fraction of the monolithic casing structure.

4. The engineered packing of claim 1, wherein the plurality of passages in the core structure have a hydraulic diameter, and the plurality of channels in the monolithic casing structure have a hydraulic diameter, and the average hydraulic diameter of the core structure is at least 10% greater than the average hydraulic diameter of the monolithic casing structure.

5. The engineered packing of claim 1, wherein each of the plurality of channels in the monolithic casing structure and each of the plurality of passages in the core structure have respective percentage volumes for directing fluid centrifugally as the fluid flows from the inlet to the outlet of the engineered packing, and the core structure has at least a 10% lower percentage volume for directing fluid centrifugally as it flows from the inlet to the outlet of the engineered packing than that of the monolithic casing structure.

6. The engineered packing of claim 1, wherein the monolithic casing structure and the core structure have respective permeabilities, and wherein the permeability of the monolithic casing structure is greater than the permeability of the core structure such that axial mass flux of fluid through the monolithic casing structure is greater than axial mass flux of fluid through the core structure.

7. The engineered packing of claim 1, wherein the plurality of passages of the core structure is defined by only perforated walls.

8. The engineered packing of claim 1, wherein the plurality of channels of the casing structure are radially arrayed.

9. The engineered packing of claim 1, wherein the monolithic casing structure and the core structure have a plurality of surfaces, and wherein at least some of the surfaces of at least one of the monolithic casing structure and the core structure comprise a catalyst.

10. The engineered packing of claim 1, wherein at least one of the monolithic casing structure and the core structure comprises at least one of a metal or ceramic substrate.

11. The engineered packing of claim 10, wherein the metal is perforated sheet metal.

12. The engineered packing of claim 1, wherein the monolithic casing structure comprises first and second columns, which each include devices, to direct a fluid flowing therethrough centrifugally and centripetally, respectively.

13. The engineered packing of claim 12, wherein the first and second columns are separated by walls, and wherein the first and second columns are in fluid communication proximate the reactor wall.

14. The engineered packing of claim 1, wherein the catalytic reactor is employed for at least one of steam reforming and for the after treatment of emissions from an internal combustion engine.

15. The engineered packing of claim 1, wherein the casing structure has a geometric configuration, and wherein the geometric configuration of the casing structure is distinct from an extension of the geometric configuration of the core structure.

16. The engineered packing of claim 1, wherein the plurality of channels are defined by non-perforated walls.

17. An engineered packing for use in a reactor comprising radially arrayed channels for directing fluid flowing therethrough centrifugally and centripetally, respectively, a plurality of radially and axially aligned walls joined by circumferentially and axially aligned walls, which circumferential walls between consecutive pairs of radially aligned walls are alternatingly more proximate a first wall and more remote from the first wall, the circumferential walls further having portions inclined at an oblique angle to the reactor axis to direct fluid centrifugally or centripetally as the fluid flows through the reactor, the engineered packing being disposed proximate the first wall.

18. The engineered packing of claim 17, wherein the packing is further defined by a second wall on an opposite side of the packing from the first wall, such that centrifugally flowing fluid is directed to impinge the first wall and centripetally flowing fluid is directed to impinge the second wall.

19. The engineered packing of claim 17, wherein the radius of the reactor wall is infinity.

* * * * *